United States Patent
Andersen et al.

(10) Patent No.: US 9,316,328 B2
(45) Date of Patent: Apr. 19, 2016

(54) VALVE ACTUATOR DEVICE, IN PARTICULAR FOR A HEATING OR COOLING SYSTEM VALVE

(71) Applicant: Danfoss A/S, Nordborg (DK)

(72) Inventors: Torben Lund Andersen, Copenhagen (DK); Soeren Hansen, Soenderborg (DK); Jesper D. Villekjaer, Boerkop (DK); Peter Alexandersen, Aarhus C. (DK); Anders Oestergaard Clausen, Ry (DK); Bjarne Frederiksen, Lemming (DK); Lars Munch, Vamdrup (DK); Ole Stig Nissen, Middelfart (DK)

(73) Assignee: Danfoss A/S, Nordborg (DK)

( * ) Notice: Subject to any disclaimer, the term of this patent is extended or adjusted under 35 U.S.C. 154(b) by 242 days.

(21) Appl. No.: 14/062,330

(22) Filed: Oct. 24, 2013

(65) Prior Publication Data

US 2014/0183387 A1 Jul. 3, 2014

(30) Foreign Application Priority Data

Oct. 30, 2012 (EP) .................................. 12007435

(51) Int. Cl.
*F16K 31/04* (2006.01)
*F16K 1/52* (2006.01)

(52) U.S. Cl.
CPC ............... *F16K 31/04* (2013.01); *F16K 1/523* (2013.01); *Y10T 137/4238* (2015.04)

(58) Field of Classification Search
CPC ..... F16K 31/04; F16K 31/0655; F16K 1/523; Y10T 137/4238–137/4266
USPC ........ 251/129.04, 129.18, 284–285; 137/237–241
See application file for complete search history.

(56) References Cited

U.S. PATENT DOCUMENTS

| 4,190,346 A | * | 2/1980 | Hutson | G03D 3/02 137/240 |
| 4,216,185 A | * | 8/1980 | Hopkins | A61L 2/16 137/240 |
| 4,848,381 A | * | 7/1989 | Livingston | A23G 7/00 137/240 |
| 4,884,720 A | * | 12/1989 | Whigham | B67D 1/0037 251/129.18 |
| 5,011,043 A | * | 4/1991 | Whigham | B67D 1/0037 251/285 |
| 5,184,571 A | * | 2/1993 | Hostetler | A01K 39/0213 137/240 |

(Continued)

FOREIGN PATENT DOCUMENTS

DE 10 2005 038 067 A1 2/2007
EP 2141396 A1 1/2010

(Continued)

OTHER PUBLICATIONS

English Translation of EP 2141396 A2, Konig, Jan. 2010.*

(Continued)

*Primary Examiner* — John Bastianelli
(74) *Attorney, Agent, or Firm* — McCormick, Paulding & Huber LLP

(57) ABSTRACT

A valve actuator device (1) for a heating or cooling system valve (2) includes a motor (10) and control means (11), said motor (10) driving actuating means (8) provided for actuating a valve element (6), said control means (11) comprising presetting means (14) for performing a presetting function. The operation possibilities of such a valve actuator device should be increased. To this end, said control means comprise flushing means for performing a flush function, said flush function overriding said presetting function.

20 Claims, 10 Drawing Sheets

(56) References Cited

U.S. PATENT DOCUMENTS

| | | | | |
|---|---|---|---|---|
| 6,427,971 | B1 * | 8/2002 | Kawabe | F01L 9/04 |
| | | | | 251/129.18 |
| 6,971,626 | B2 * | 12/2005 | Seberger | G05B 19/058 |
| | | | | 251/129.04 |
| 8,019,569 | B2 * | 9/2011 | Bolz | F02D 41/20 |
| | | | | 251/129.04 |

FOREIGN PATENT DOCUMENTS

| | | | |
|---|---|---|---|
| EP | 2431640 A2 * | 3/2012 | |
| GB | 2473964 A * | 3/2011 | |
| JP | 2011-245978 | 12/2011 | |
| KR | 20-0370202 | 12/2004 | |
| KR | 10-2012-0029336 A | 3/2012 | |
| RU | 2443928 C2 | 1/2011 | |

OTHER PUBLICATIONS

English Translation of EP 2431640 A2, Schmidt et al., Mar. 2012.*
Korean Notice of Grounds for Rejection for Korean Patent Application No. 2013-0128454 dated Jul. 6, 2015 and its English Translation (13 pages).

* cited by examiner

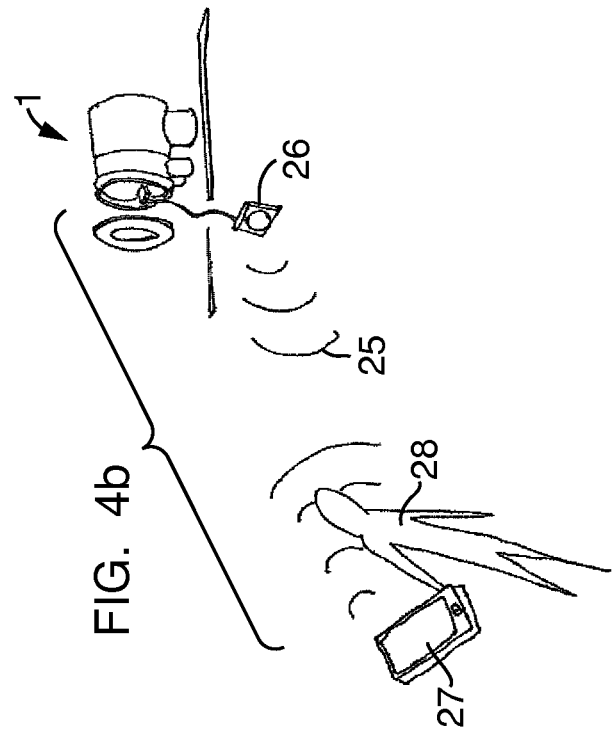
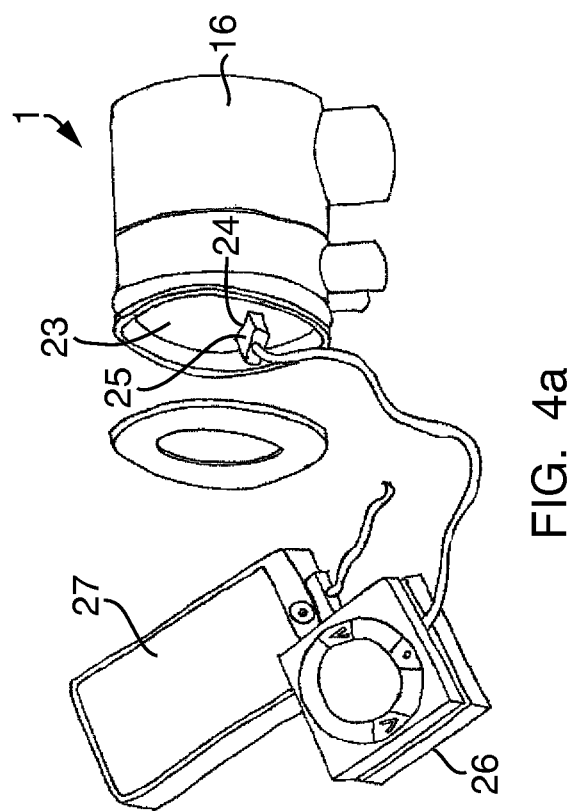
FIG. 4b
FIG. 4a

VALVE ACTUATOR DEVICE, IN PARTICULAR FOR A HEATING OR COOLING SYSTEM VALVE

CROSS REFERENCE TO RELATED APPLICATION

Applicant hereby claims foreign priority benefits under U.S.C. §119 from European Patent Application No. 12007435.6 filed on Oct. 30, 2012, the contents of which are incorporated by reference herein.

TECHNICAL FIELD

The present invention relates to a valve actuator device, in particular for a heating or cooling system valve, said device comprising a motor and control means, said motor driving actuating means provided for actuating a valve element, said control means comprising presetting means for performing a presetting function.

BACKGROUND

Such a valve actuator device is known from DE 10 2005 038 067 A1. The motor is in the form of a stepping motor. When the number of steps of the motor is limited, the stroke of the actuating means and therefore the stroke of the valve element is limited as well. In this way it is possible to realize a presetting function without demounting the valve actuator device from the valve.

SUMMARY

It is an object of the present invention to increase operation possibilities of a valve actuator device.

This object is solved in a valve actuator device of the kind mentioned above in that said control means comprise flushing means for performing a flush function, said flush function overriding said presetting function.

Such a valve actuator device can limit the movement of the actuating means and consequently the stroke of the valve element therefore limiting the maximum flow through the valve which is actuated by the valve actuator device. In this way a presetting function is realized. The presetting of the valve can be changed without removing the valve actuator device from the valve. However, in some cases such a presetting function is a disadvantage since, as mentioned above, the maximum stroke and therefore the maximum distance between the valve element and a valve seat is limited. This can lead to an insufficient function of the valve since the valve can be clocked by debris or the like. However, in the device according to the present invention, the limited opening of the valve, which is controlled by the presetting function, can be overridden by a flush function. Said flush function allows the valve element to open to the maximum opening degree or even more, i.e. beyond the normal working range to enable flushing of the valve or the system in which the valve is arranged. Such flushing can be performed during normal operation or before starting to use the system. Although during normal operation a presetting function is realized limiting the maximum flow through the valve, which is controlled by the valve actuator device, limitation of the flow can be interrupted from time to time or at least once to flush the valve.

Preferably at least one of said presetting means and said flushing means is remotely controlled. In this case an operator or installer does not need direct access to the valve. This is an advantage in large buildings having a great number of valves each controlled by a valve actuator device, since it is not necessary that the installer comes to each valve.

Alternatively or additionally at least one of said presetting means and said flushing means is locally controlled. This means, that the installer or operator needs access to the valve actuator device. However, this access can be used to visually inspect the surroundings of the valve which is in some cases valuable as well. Furthermore it is possible to control a presetting means locally and the flushing means remotely or to control the presetting means remotely and the flushing means locally.

Preferably said presetting means comprise at least one of a potentiometer, a switch arrangement, and a push button and display arrangement. With these means the presetting means can be controlled locally.

In another preferred embodiment said presetting means comprise an interface connectable to an installer tool. The installer can connect the installer tool to the valve actuator device by means of physical line or by means of a wireless signal line. The installer tool can be used to locally or remotely change the presetting of the valve actuator device.

Preferably said presetting means are connected to a bus system. Large modern buildings having a great number of rooms to be cooled or heated usually are provided with a bus system, e.g. MOD bus or BACnet or the like. Using such a bus system to be connected with the presetting means or the control means allow for a remote change of presetting parameters.

Preferably said flushing means comprise initiating means. Basically the flush function is an on/off event. Such an event has to be started only and the time for flushing has to be limited. The starting or initiating of the flushing therefore needs only a very simple signal. It is not necessary to transmit defined values or parameters with a signal initiating flushing.

Preferably said flushing means comprise a push button arrangement. Pressing the push button is in most cases sufficient to start the flush function.

In this case it is preferred that said push button arrangement comprises at least two push buttons, in a first mode of operation said push buttons being part of said presetting means and in a second mode of operation said push buttons being part of said flushing means. When for example two push buttons are provided one push button can be used to change the presetting in a direction of a larger maximum flow through the valve and the other push button can be used to change the presetting in a direction to a smaller maximum flow. In this case the push buttons are part of said presetting means. The first mode of operation means that only one push button is pressed at a time. When the two push buttons are pressed simultaneously or within a short time frame a second mode of operation is realized. When the push buttons are pressed simultaneously, the flushing is started.

In a preferred embodiment said flushing means comprise an interface connectable to an installer tool. This interface can be the same one as for the presetting means.

Preferably said flushing means are connected to a bus system. The bus system can be the same as the bus system for the presetting means. In this way it is possible to remotely control the flushing means.

In a preferred embodiment said control means comprise a signal input, said control means controlling said presetting means, if a signal level at said signal input is within a predetermined first range, and controlling said flushing means, if said signal level is within a predetermined second range different from said first range. In a first example a first range can be a positive voltage, e.g. in the range from 0-10 VDC, and the second range is a negative voltage, e.g. −5 VDC. In another example the first range can be from 0 to 9.5 VDC and the second range can be above 9.5 VDC. The control mean "knows" which function is to be performed, e.g. whether presetting should be changed or whether the valve of the system should be flushed.

In another preferred embodiment said control means comprise a separate input controlling said flushing means. In this embodiment an extra wire might be used in the line supplying energy and/or control signals to the actuator.

In another preferred embodiment said control means comprise a decoder decoding a signal at a signal input and depending on the decoded signal controlling said flushing means. For example, the signal to be decoded can be the signal for adjusting the actuating means or the signal for changing parameters for the presetting function. These signals usually are smooth signals without steep pulses. When it is necessary to flush the valve or the system this signal can be coded by inserting a predetermined number of two or more pulses, each pulse being longer than a predetermined first time and shorter than a predetermined second time. When the number of pulses has been passed the control mean "knows" that flushing should be initiated. The flushing is stopped when the signal returns to a normal value.

BRIEF DESCRIPTION OF THE DRAWINGS

Preferred examples of the invention will now be described in more detail with reference to the drawing within:

FIGS. 4A and 4B show a third embodiment of the valve actuator device.

DETAILED DESCRIPTION

Figure 1:
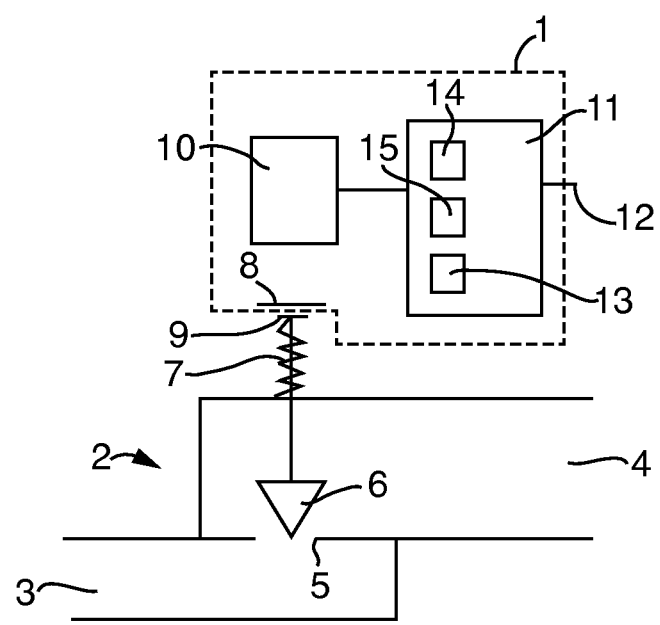
FIG. 1 is schematic presentation of a valve actuator device in connection with a valve.

FIG. 1 schematically shows a valve actuator device 1 together with a valve 2.

In a manner known per se the valve 2 comprises an inlet 3, an outlet 4 and a valve seat 5 between the inlet 3 and the outlet 4. A valve element 6 cooperates with the valve seat 5 in order to control a flow of fluid from the inlet 3 to the outlet 4. This flow is basically determined by a distance between the valve seat 5 and the valve element 6. Means for keeping constant a pressure over the valve seat 5 may be provided, but are not shown. If such means are used, the flow through the valve is constant for a specific position of the valve element 6 independent of the pressure over the valve.

The valve element 6 is forced away from the valve seat by means of an opening spring 7. In the opposite direction the valve element 6 is loaded by actuating means 8 acting on a pressure plate 9 connected to the valve element 6 or simply on a front face of a valve stem.

The actuating means 8 are driven by a motor 10. The motor 10 can be a stepping motor or any other kind of electric motor.

The motor is controlled by control means 11. Said control means 11 comprise an input 12. The input 12 can receive temperature data and other data, for example from a bus system. The control means 11 may comprise temperature control means 13 adjusting the distance between the valve seat 5 and the valve element 6 on the basis of the temperature data. Furthermore the control means 11 comprise presetting means 14 for performing a presetting function and flushing means 15 for performing a flush function.

The presetting means limit the opening degree of the valve 2 during normal operation. In other words, even if a high heating demand is signaled at the input 12, the opening stroke of the valve element 6 with respect to the valve seat 5 is limited to a predetermined value. Such a presetting is used to distribute heating fluid over a number of heat exchangers which are arranged in parallel. The same is of course true for a cooling system in which the valve 2 controls the flow of the cooling fluid.

The presetting of the valve 2 by means of the valve actuating device makes it much easier to perform the presetting. It is not necessary to remove the valve actuator device from the valve as it is the case in heat exchanger valve according to the prior art.

However, in some cases it is necessary or at least desirable to flush the valve 2. In this case, the valve element 6 has to be moved as far as possible away from the valve seat 5. In order to be able to flush the valve 2 the flushing means 15 have a priority higher than the presetting means 14 so that the flush function can override the presetting function. Although the presetting means 14 have defined a maximum opening stroke of the valve element 6, the valve element is moved farther away from the valve seat 5 when the flushing means 15 are activated.

There are a number of possibilities to operate the presetting means 14 and the flushing means 15. The presetting means 14 and the flushing means 15 can be remotely controlled. To this end the respective control signals can be supplied via the input 12 or via other inputs not shown.

Furthermore it is possible to control the presetting means 14 and the flushing means 15 locally. In this case an operator or an installer needs access to the valve actuator device in order to perform the necessary steps for adjusting the presetting means 14 or to start the flushing means 15.

Furthermore it is possible to control the presetting means 14 locally and the flushing means 15 remotely or to control the presetting means 14 remotely and the flushing means 15 locally.

Figure 2:
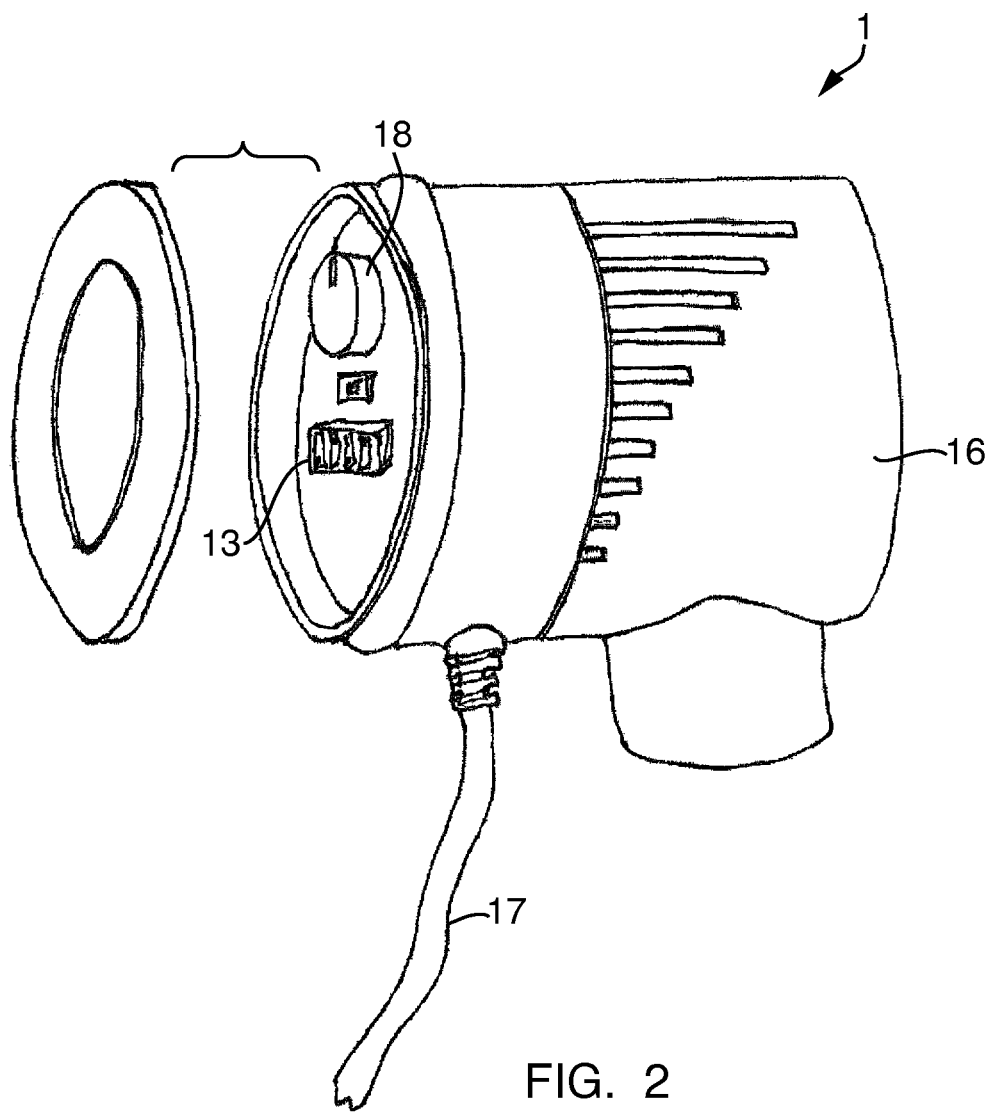
FIG. 2 shows a first embodiment of the valve actuator device.

FIG. 2 shows the valve actuator device 1 having a housing 16 in which the motor 10 and other relevant parts, like the control means 11 are incorporated. However, the control means 11 can be arranged outside said housing 16 and be connected with the housing 16 by means of a signal line like the signal line 17 shown in FIG. 2.

The presetting means 14 can comprise a potentiometer or any other kind of turnable adjusting means, the turning knob 18 of which is arranged at a front face of the housing 16. Turning the turning knob of the potentiometer changes presetting parameters.

Furthermore the presetting means 14 can be operated by means of DIP switches 19 or other switches which are arranged at the front face of the housing as well. In most cases, only one of potentiometer and DIP switches 19 is used. However, it is possible to use both elements.

Figure 3:
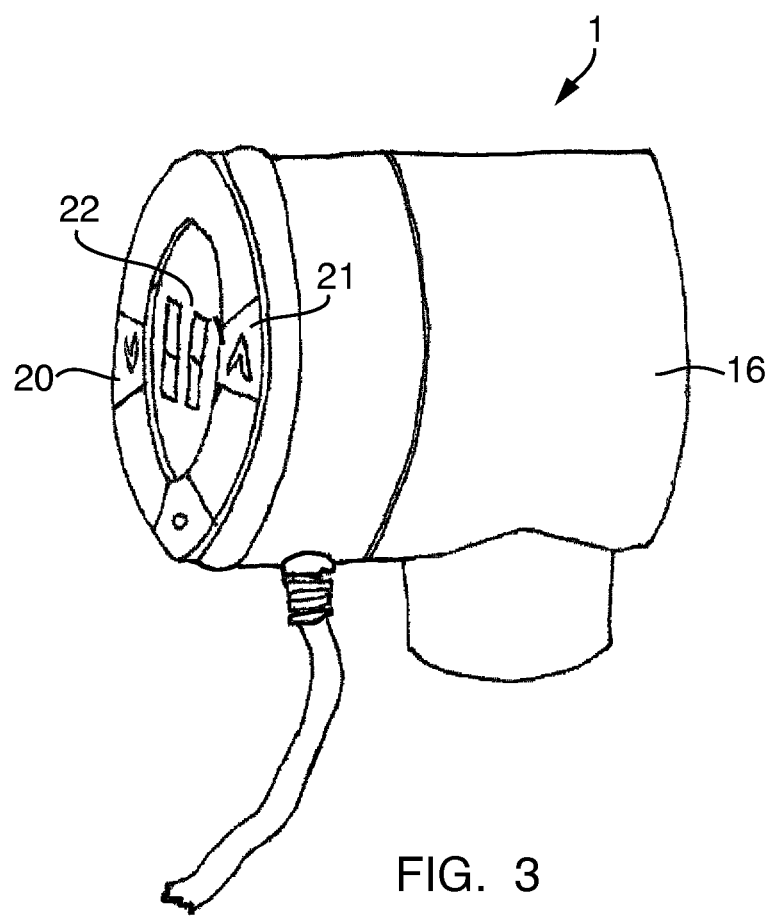
FIG. 3 shows a second embodiment of the valve actuator device.

FIG. 3 shows another embodiment of the valve actuator device 1. The front face of the housing 16 is provided with two push buttons 20, 21 and with a LED display 22. The push buttons 20, 21 show arrows to indicate in which direction a presetting is changed. The LED display can show presetting values in numerical form. It is also possible to use a touch screen instead of the push buttons 20, 21 and the LED display 22.

The push buttons 20, 21 can be used to change presetting parameters, as explained. In this first mode of operation only one of the two push buttons 20, 21 is pressed at the time since it is usually not desired to change the parameters of presetting in different directions at the same time.

However, if in a second mode of operation both push buttons 20, 21 are pressed simultaneously or almost simultaneously, this pressing being interpreted as start or initiating of a flush operation. In this case the flushing means 15 are operated. The flushing means 15 override the function of the presetting means 14 and open the valve 2 as far as it is possible, e.g. to 100% or even more beyond the normal working range. Such a flushing can be performed before starting to use the system or at regular intervals or whenever it is needed.

FIG. 4 shows two views of another embodiment.

The valve actuating device 1 shows at a front face 23 of the housing 16 an interface 24. The interface 24 can be connected to a plug 25. The plug 25 is connected to an installer tool 26, 27. The installer tool 26 may have a remote control 27 so that the installer 28 can perform the presetting via a wireless connection 29, e.g. bluetooth or radio frequency. The remote control 27 can have the form of a mobile telephone on which a corresponding app has been downloaded.

The installer tool 26 can be used for presetting, i.e. for activating the presetting means 14 and for flushing, i.e. for activating the flushing means 15.

Figure 5:
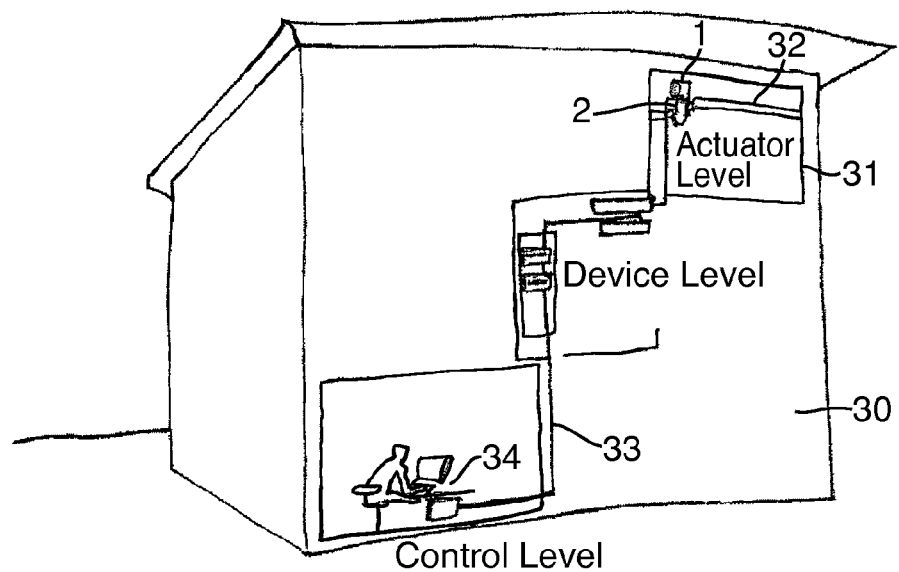
FIG. 5 shows a schematic illustration of a building equipped with a valve actuator device.

FIG. 5 shows a building 30 having a plurality of rooms. One room 31 is shown. The room 31 is equipped with a radiator (not shown). This radiator is controlled by a valve 2 in a fluid line 32. The valve 2 is controlled by the valve actuator device 1. The valve actuator device 1 is remotely controlled over a bus system 33. The bus system 33 connects the valve actuator device 1 with a central unit 34. The central unit 34 can control a number of valve actuator devices 1. It can control the presetting function as well as the flushing function or other relevant functions.

Figure 6:
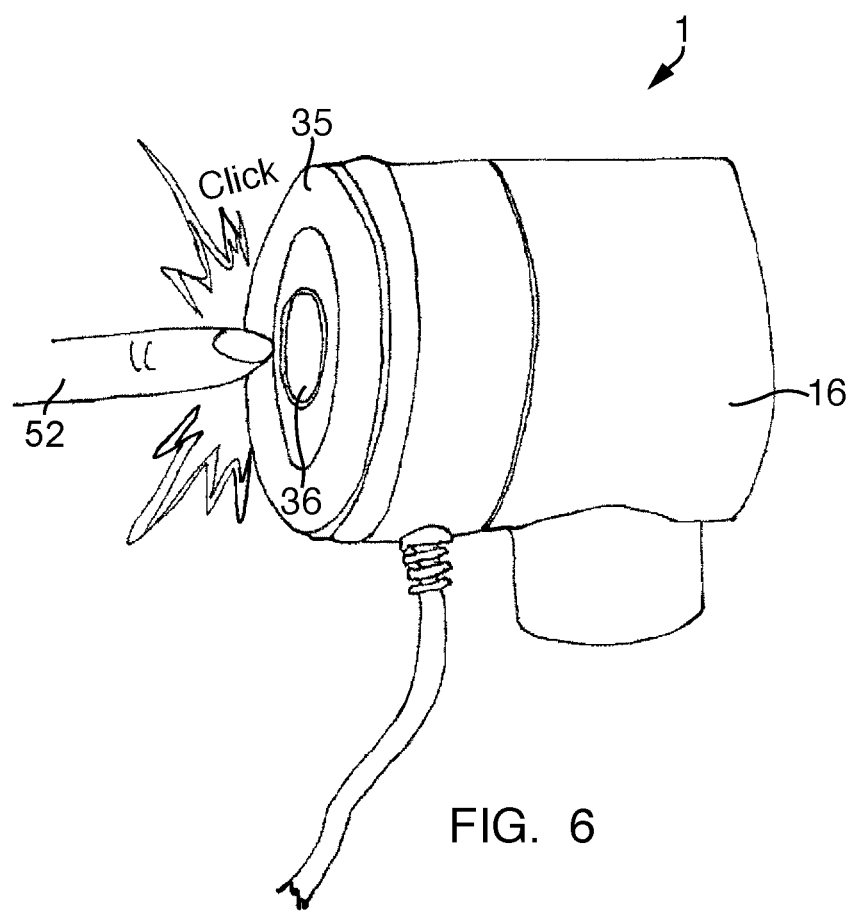
FIG. 6 shows a fourth embodiment of the valve actuator device.

FIG. 6 shows a valve actuator device 1, the housing 16 of which is provided with a cover 35 at its front face. The turning knob 18 of the potentiometer and/or the DIP switch 19 of the embodiment shown in FIG. 2 can be arranged between the cover 35 and the housing 16.

The cover 35 comprises a push button 36 which upon pressing by a finger 52 or any other tool initiates flushing of the valve 2, i.e. to operate the flushing means 15. The locally flushing function can also be combined with the flush function controlled via the bus system.

When it is intended to remotely control the flushing means 15, there are several ways to do so.

Figure 7:
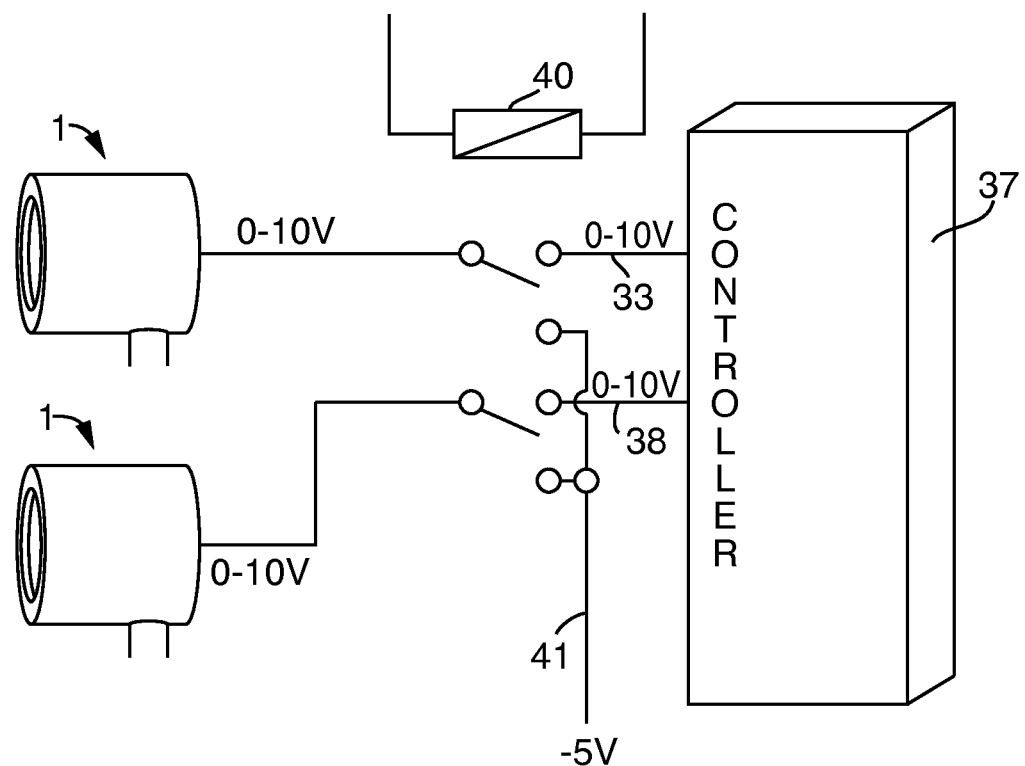
FIG. 7 is a schematic representation of signaling means for the valve actuator device.

FIG. 7 shows a first possibility.

During normal operation, a controller 37 supplies on output lines 38, 39 a voltage signal in the range between 0 and 10 VDC. This signal on the signal line 38, 39 is supplied to the input 12 of each valve actuator device 1 shown in FIG. 7. The signals on the signal lines 38, 39 define the opening degree of the valves 2, however, this opening degree is limited by the presetting function performed by the presetting means 14.

When a flushing of the valve 2 is necessary, a relay 40 is activated. The relay 40 interrupts the connection between the controller 37 and the valve actuator devices 1 and connects the valve actuator devices 1 to a voltage line 41 supplying a negative voltage of e.g. −5 VDC. When the voltage supplied to the valve actuator devices 1 is negative, the control means 11 deactivate the presetting means 14 and activate the flushing means 15 so that flushing can be performed.

Figure 8:
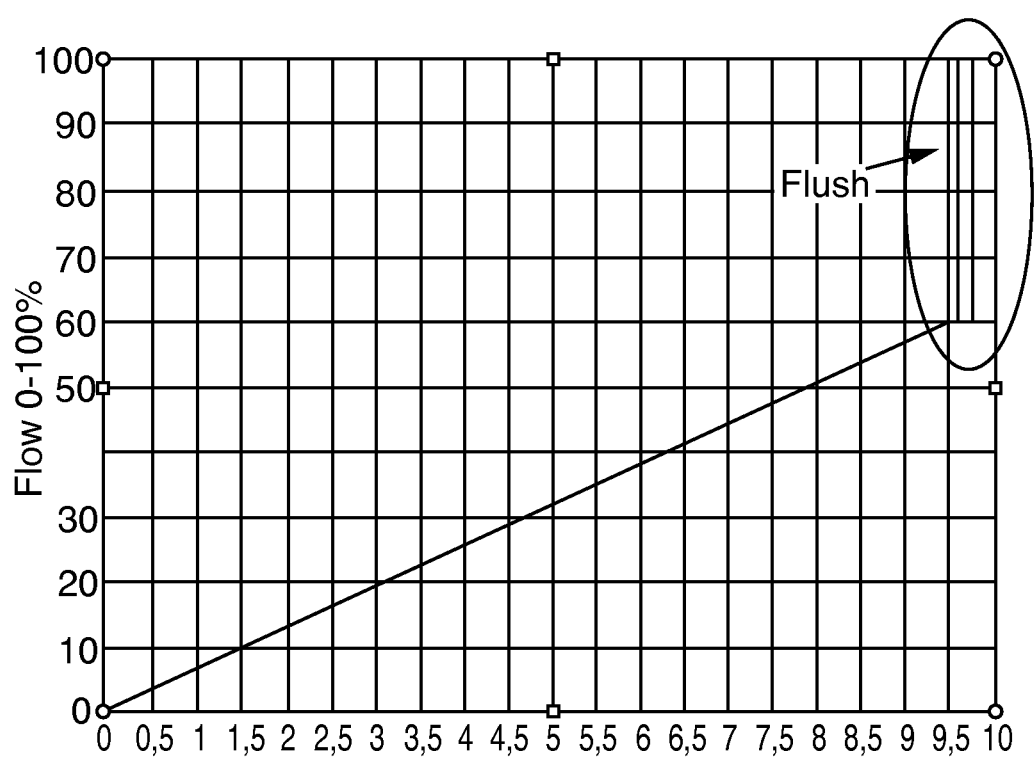
FIG. 8 shows a further possibility for initiating a flush.

FIG. 8 shows a second possibility for initiating flushing remotely.

In this example, the valve actuator device is preset to 60%, i.e. even in the fully open condition the valve allows only 60% of the maximum flow to pass. The horizontal axis shows the control input from 0 to 10 VDC. It can be seen that there is an almost linear relation between the input voltage and the flow through the valve.

In this example, the valve actuator device is controlled linearly in a range between a voltage of 0 to 9.5 VDC only. If the input voltage exceeds 9.5 VDC, the valve 2 is opened to allow 100% flow as it is indicated in the upper right corner. Therefore, a flush is performed.

Figure 9:
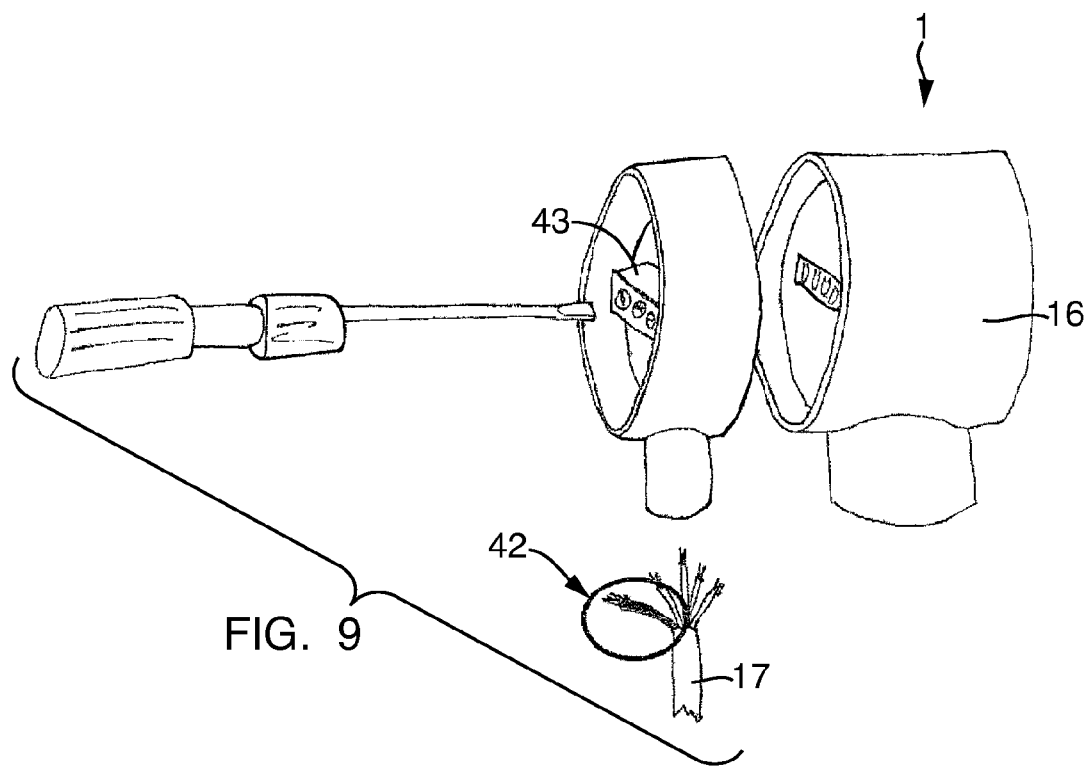
FIG. 9 shows another possibility for initiating a flush and FIG. 10 shows a further possibility for initiating a flush.

FIG. 9 shows a further possibility. The signal line 17 to the housing 16 of the valve actuator device 1 comprises an additional wire 42 which is connected to a connector 43. When a voltage appears on this additional wire 42, a flushing is performed.

Figure 10:
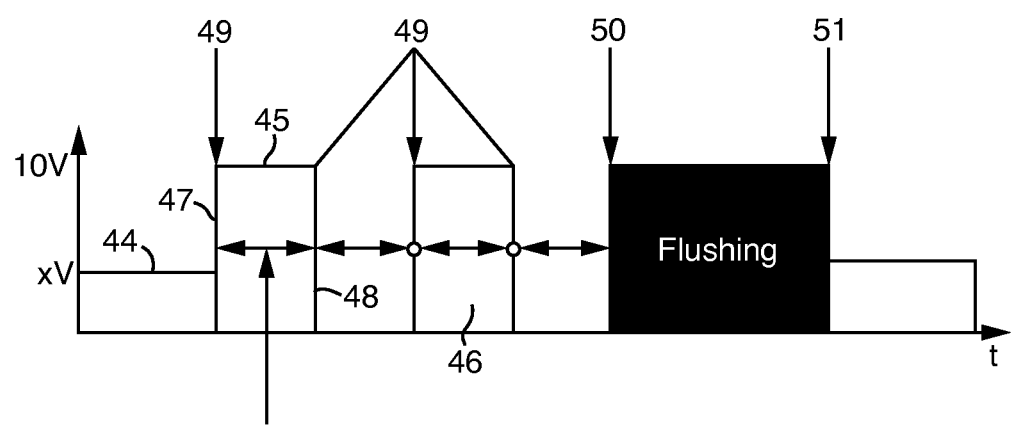

FIG. 10 shows another possibility to start flushing. The horizontal axis shows the time t. The vertical axis shows the voltage at the input line 12. During "normal operation" this voltage varies only slightly over the time. However, such changes are small and the voltage signal 44 does not jump, i.e. it does not show step pulses. However, this is only true during normal operation in which the valve 2 is controlled according to an ambient temperature for example.

In order to perform flushing, a number of pulses 45, 46 is generated. Theoretically, one pulse 45 is sufficient. However, at least two pulses 45, 46 are preferred. Each pulse must be longer than a predetermined first time and shorter than a predetermined second time. Each pulse 45, 46 starts with a rising flank 47 and ends with a falling flank 48. Each flank 47, 48 can be considered as "transition" 49. After a predetermined number of transitions 49 flushing starts. In the present example, four transitions 49 or two pulses 45, 46 are needed. Flushing starts with a fifth transition or at the beginning of the third pulse. The third pulse can be longer. At the end 51 of the third pulse the flushing ends. This means that the voltages changes again. In this case, normal operation is reassumed. The way of operation shown in FIG. 10 can be considered as some kind of code. In this case, the control means 11 comprise a decoder (not shown) decoding the signal shown in FIG. 10. Depending on the decoded signal the flushing means 15 are operated. The pulses 45, 46 can form a "Morse Code" or the like.

Of course, any other kind of code can be used to initiate the flushing. Such a code can also be used for presetting.

If for security reasons the coded signal is sent more than once, the decoder may be provided with a check sum controller. When the check sum controller approves the validity of one coded signal, the other coded signals can be dismissed.

Another possibility would be to introduce a kind of feedback.

Local presetting of valve can be made without removing the actuator from the valve. A local presetting at e.g. 50% means that a 0-10 V control signal will control flow in the range 0-50% of rated valve flow—flush can be operated from remote using one of the flowing options:

a) Negative control voltage,
b) A modulated (Morse coded) control signal,
c) An extra wire or
d) A digital bus code.

A local DIP setting changes the control signal in the following way: 0-9 V is now the full control signal and 10 V is the flush signal. A local presetting at e.g. 50% now mans that the 0-9 V control signal will control flow in the range 0-50% of rated valve flow—flush can be established simply by bringing the control signal up to a level above 9.5 V.

It is also possible in a simple way to operate flush and flow presetting remote by the following steps:
 a. Set potentiometer to 100%
 b. Flush is obtained by bringing control voltage to 10 V—valve 100% open.
 c. Flow control e.g. in the range of 0-50% is obtained directly from the system simply by operating control signal in the range of 0-5 V.

While the present invention has been illustrated and described with respect to a particular embodiment thereof, it should be appreciated by those of ordinary skill in the art that various modifications to this invention may be made without departing from the spirit and scope of the present.

What is claimed is:

1. A valve actuator device for a heating or cooling system valve, said valve actuator device comprising a motor and a control means, said motor driving an actuating means provided for actuating a valve element, said control means comprising presetting means for performing a presetting function in which the stroke of the valve element is limited, wherein said control means comprise flushing means for performing a flush function, said flush function overriding said presetting function.

2. The valve actuator device according to claim 1, wherein at least one of said presetting means and said flushing means is remotely controlled.

3. The valve actuator device according to claim 1, wherein at least one of said presetting means and said flushing means is locally controlled.

4. The valve actuator device according to claim 3, wherein said presetting means comprise at least one of a potentiometer, a switch arrangement, and a push button and display arrangement.

5. The valve actuator device according to claim 1, wherein said presetting means comprise an interface connectable to an installer tool.

6. The valve actuator device according to claim 2, wherein said presetting means are connected to a bus system.

7. The valve actuator device according to claim 1, wherein said flushing means comprise initiating means.

8. The valve actuator device according to claim 1, wherein said flushing means comprise a push button arrangement.

9. The valve actuator device according to claim 8, wherein said push button arrangement comprises at least two push buttons, in a first mode of operation said push buttons being part of said presetting means and in a second mode of operation said push buttons being part of said flushing means.

10. The valve actuator device according to claim 1, wherein said flushing means comprise an interface connectable to an installer tool.

11. The valve actuator device according to claim 1, wherein said flushing means are connected to a bus system.

12. The valve actuator device according to claim 1, wherein said control means comprise a signal input, said control means controlling said presetting means, if a signal level at said signal input is within a predetermined first range, and controlling said flushing means, if said signal level is within a predetermined second range different from said first range.

13. The valve actuator device according to claim 1, wherein said control means comprise a separate input controlling said flushing means.

14. The valve actuator device according to claim 1, wherein said control means comprise a decoder decoding a signal at a signal input and depending on the decoded signal controlling said flushing means.

15. The valve actuator device according to claim 2, wherein at least one of said presetting means and said flushing means is locally controlled.

16. The valve actuator device according to claim 2, wherein said presetting means comprise an interface connectable to an installer tool.

17. The valve actuator device according to claim 3, wherein said presetting means comprise an interface connectable to an installer tool.

18. The valve actuator device according to claim 4, wherein said presetting means comprise an interface connectable to an installer tool.

19. The valve actuator device according to claim 2, wherein said flushing means comprise initiating means.

20. The valve actuator device according to claim 3, wherein said flushing means comprise initiating means.

* * * * *